United States Patent [19]

Francisco, Jr.

[11] Patent Number: 5,192,435
[45] Date of Patent: Mar. 9, 1993

[54] SELF-CLEANING VACUUM HEAD FOR RECOVERING OIL FROM BEACHES AND THE LIKE

[75] Inventor: Allen C. Francisco, Jr., Bellevue, Wash.

[73] Assignee: Fraser Environmental Systems, Inc., Seattle, Wash.

[21] Appl. No.: 712,192

[22] Filed: Jun. 7, 1991

Related U.S. Application Data

[63] Continuation of Ser. No. 519,284, May 4, 1990, Pat. No. 5,076,919.

[51] Int. Cl.[5] .............................................. B01D 35/02
[52] U.S. Cl. ...................... 210/241; 15/340.1; 209/235; 209/272; 210/400; 210/406; 210/924
[58] Field of Search .................... 37/58, 59; 15/300.1, 15/340.1; 134/21, 70, 124, 104.4, 201; 210/241, 242.3, 400, 401, 406, 922–924; 209/235, 268, 272, 307; 405/303

[56] References Cited

U.S. PATENT DOCUMENTS

| | | | |
|---|---|---|---|
| 1,296,868 | 3/1919 | Smith | 15/1.7 |
| 1,601,774 | 10/1926 | Scheffer | 15/1.7 |
| 2,906,402 | 9/1959 | Blankevoort | 37/58 |
| 2,926,961 | 3/1960 | Diebold | 15/1.7 |
| 3,035,695 | 5/1962 | Buchwald et al. | 15/1.7 |
| 3,035,698 | 5/1962 | Novak | 209/235 |
| 3,190,451 | 6/1965 | Holland | 210/400 |
| 3,337,889 | 8/1967 | West | 15/1.7 |
| 3,859,163 | 1/1975 | Haythornthwaite | 15/320 |
| 3,868,739 | 3/1975 | Hargrave | 15/1.7 |
| 3,939,076 | 2/1976 | Seibert | 210/406 |
| 3,969,834 | 7/1976 | Geier et al. | 37/58 |
| 4,037,335 | 7/1977 | Sandberg | 37/58 |
| 4,083,134 | 4/1978 | Osterdoom | 37/58 |
| 4,132,010 | 1/1979 | Deland | 134/123 |
| 4,157,016 | 6/1979 | Wendt et al. | 134/105 |
| 4,168,562 | 9/1979 | Maasberg | 15/340.1 |
| 4,194,978 | 3/1980 | Crema | 210/241 |
| 4,285,815 | 8/1981 | Gallottini | 210/400 |
| 4,350,591 | 9/1982 | Lee | 210/400 |
| 4,401,475 | 8/1983 | Eriksson et al. | 210/924 |
| 4,410,426 | 10/1983 | Cloutier | 210/923 |
| 4,492,001 | 1/1985 | Hedrenius | 210/924 |
| 4,575,426 | 8/1986 | Littlejohn et al. | 210/924 |
| 4,595,501 | 6/1986 | Queyroix | 210/400 |
| 4,769,142 | 9/1988 | Withnall | 210/924 |
| 4,840,729 | 6/1989 | Levine | 210/241 |
| 4,852,211 | 8/1989 | Strausak | 15/1.7 |
| 5,076,919 | 12/1991 | Francisco | 210/241 |
| 5,089,121 | 2/1992 | Mewhinnie | 210/400 |

FOREIGN PATENT DOCUMENTS

| | | | |
|---|---|---|---|
| 485963 | 10/1926 | Fed. Rep. of Germany | 15/1.7 |
| 2559806 | 2/1984 | France | 210/924 |
| 8103793 | 8/1981 | Netherlands | 15/1.7 |

Primary Examiner—Robert A. Dawson
Assistant Examiner—Joseph Drodge
Attorney, Agent, or Firm—Michael J. Folise

[57] ABSTRACT

A self-cleaning vacuum head is disclosed which has the ability to discriminate between particles of different size, or the ability to separate fluids from particulate matter. The invention has two relatively moving surfaces which provide a changing locus of vacuum so that particles drawn against the surfaces are later separated therefrom. Each of the two surfaces has slots which are transverse to one another. The surfaces are moved relative to one another in a moving direction which is transverse to the orientation of the slots on the first of the moving surface, and also transverse to the slots on the second surface. The transverse arrangement of the slots, and the relative movement of the slots in a direction which is transverse to each of the slots causes particles drawn against the surface to roll about two substantially perpendicular axes to encourage thorough decontamination of the particles. An oil spill clean-up system is also disclosed utilizing the self-cleaning vacuum head.

16 Claims, 3 Drawing Sheets

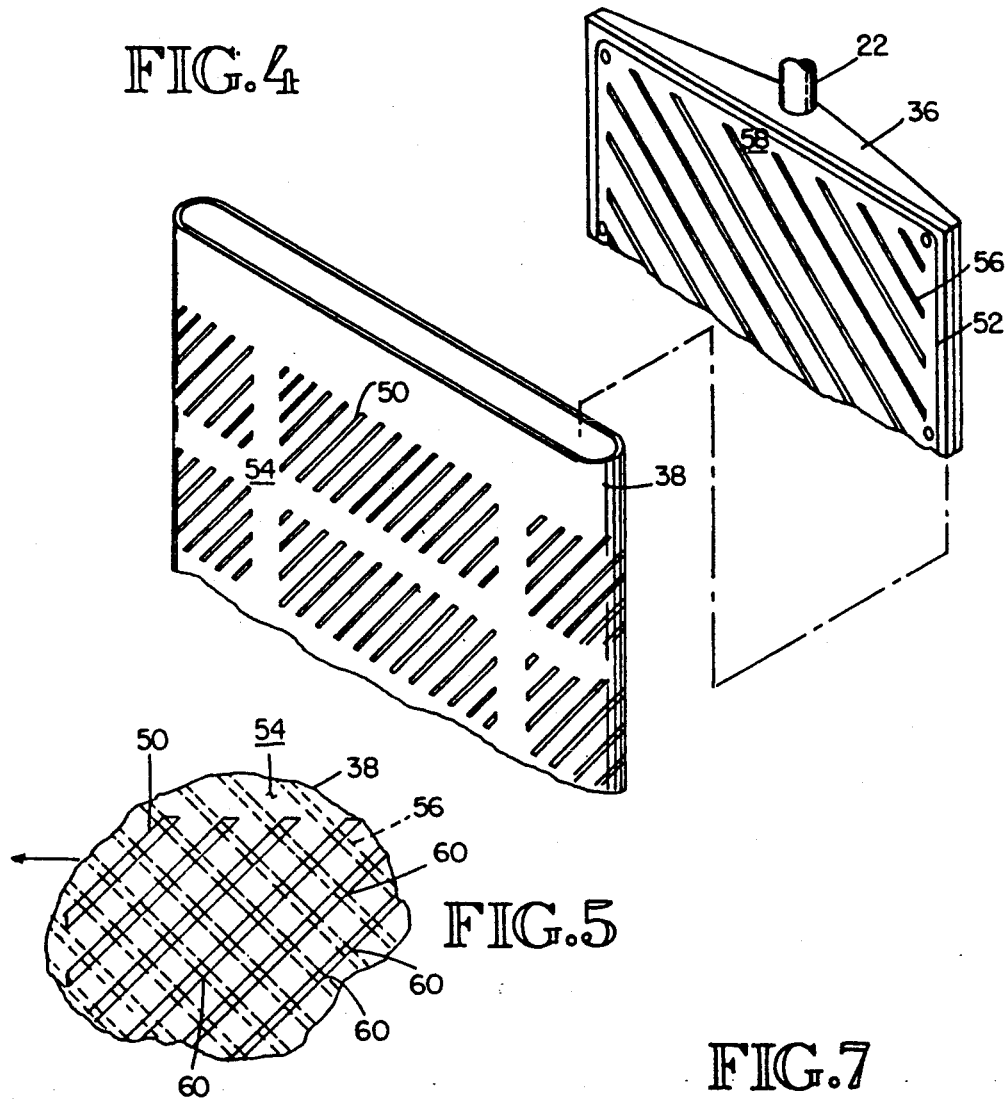
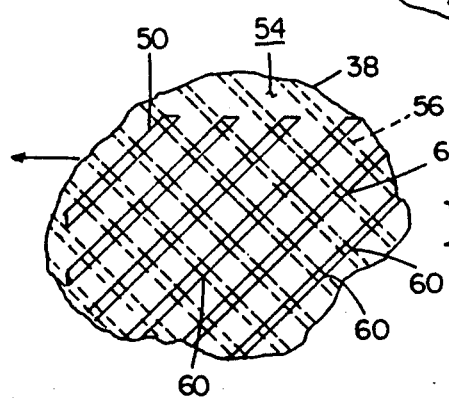
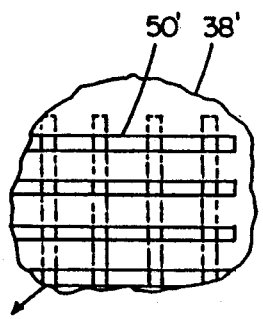
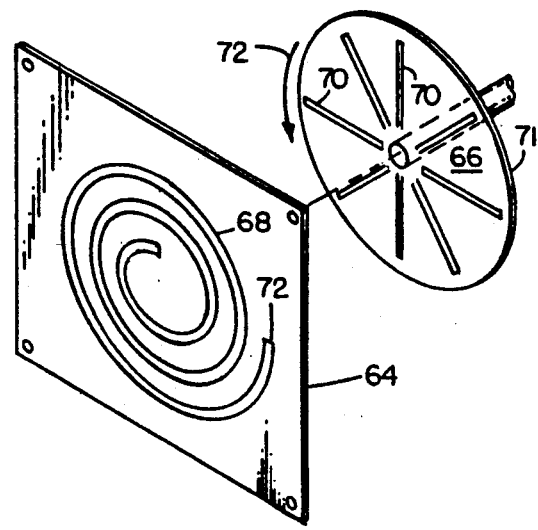

SELF-CLEANING VACUUM HEAD FOR RECOVERING OIL FROM BEACHES AND THE LIKE

CROSS-REFERENCE TO RELATED APPLICATION

This application is a continuation of U.S. application Ser. No. 07/519,284 filed May 4, 1990, now U.S. Pat. No. 5,076,919.

TECHNICAL FIELD

The invention is related to apparatus and techniques for removing contaminants, including fluid from particulate matter. More specifically, the invention is related to apparatus and techniques for recovering oil or other hazardous materials from beaches and the like.

BACKGROUND OF THE INVENTION

Large quantities of oil are presently transported from oil-producing nations to oil-consuming nations by various means, including large sea-going vessels. As the number and size of such vessels increases, the probability of a large oil spill occurring, with its attendant, serious environmental consequences also increases. A number of such accidents have occurred which have resulted in contamination of beaches with possibly permanent environmental damage.

Substantial progress has been made in the recovery of oil spilled on large bodies of water. Typically, the oil spill is surrounded by a floating boom to contain the spill. Conventional vacuuming and filtering equipment are then employed to remove the oil from the circumscribed area, as the oil will continue to float on the surface of the water as long as the more volatile components of the oil have not evaporated. Such efforts have proven effective as long as the oil remains at sea, the booms are quickly deployed, and the sea is not too rough.

Recovering oil from beaches is substantially more difficult than recovering oil from the sea. The beach environment contains a large number of organisms which live on the beach, and below the surface of the beach up to a depth of approximately one foot. In contrast, the upper layer of the ocean is a relatively "dead" ecological environment. Therefore, oil spills which have washed up on beaches generally cause significantly greater ecological damage than oil spills which are contained at sea.

Unfortunately, no currently known technologies have been successful in recovering oil directly from beaches in an ecologically acceptable manner. Presently, the most effective method of cleaning oil contaminated beaches is to wash the spilled oil back into the ocean so that the boom and vacuum method described above can be employed. This technique is only successful if the oil spill is fresh (i.e., the volatiles have not evaporated). If the oil has begun to evaporate, the beach deposit becomes a heavy sludge which can only be washed off with steam or extremely hot water at high pressure. This combination destroys the beach and is injurious to the organisms which live on and under the beach.

Once substantial evaporation of the oil has occurred, the only current techniques which are at all successful in removing the oil involve removing the top layer of sand or gravel from the beach with shovels, treating the same and redepositing the sand/gravel back onto the beach. This process completely destroys the ecological activity in the most ecologically active layer of the beach, and is also an extremely expensive procedure. In addition, this technique is slow, allowing large segments of contaminated beaches to exist for some time. As a result thereof, water fowl, turtles, and other marine animals, etc., which inhabit the beach/ocean interface become contaminated.

Various prior art devices have been described for treating contaminated beaches. The amphibious vehicle disclosed in U.S. Pat. No. 4,769,142, to Withnal, is propelled on the surface of the beach by large rollers which support an oil-absorbent sponge on the perimeter thereof. As the rollers move along the surface of the beach, the sponge absorbs the oil. The oil is removed from the sponge by pinch rollers. The roller sponge described by Withnal would only be effective at removing oil from the surface of the beach if the oil had not begun to evaporate. Furthermore, this device does nothing to treat the first foot or so of material under the beach surface which contains substantial numbers of living organisms.

In another design disclosed in U.S. Pat. No. 4,492,001, to Hedrenious, absorbent material is discharged through a duct onto the beach. The oil is absorbed by the sorbent material for later withdrawal from the surface such as by a vacuum. The Hedrenious device would also only be effective during the early stages of a beach contamination before the oil had begun to evaporate. In addition, this device would also fail to treat any portion of the beach below the immediate top surface thereof.

In addressing the problem of treating the entire vertical depth of the beach which may be contaminated, Wendt et al. disclose a cryogenic beach-cleaning device in U.S. Pat. No. 4,157,016 which freezes the upper layer of the beach with a cryogenic fluid such as liquid nitrogen. A tractor-like device drives a shovel which scoops up and breaks up the frozen beach surface for later reprocessing. This technique would certainly destroy all of the organisms in the treated layer and suffers from the processing costs which are presently encountered by the manual shoveling technique.

In view of the above, a need exists for a device which can effectively remove oil deposited on a beach, whether the oil has begun to evaporate or not, without substantially disturbing the physical structure of the beach or killing the organisms which reside thereunder.

SUMMARY OF THE INVENTION

It is an object of the present invention to provide an apparatus which can separate a fluid such as oil from a particulate medium, such as a beach, without substantially disturbing the structure of the medium.

It is also an object of the invention to achieve the above object if the fluid has evaporated to a heavy sludge state.

It is yet another object of the invention to achieve the above two objects while minimizing the ecological impact on organisms residing in the medium.

The above objects, and other objects and advantages of the invention which will become apparent from the description which follows, are achieved by providing a media treatment device and technique which removes viscous fluid from particulate matter without substantially disturbing the structure of the particulate medium.

In its preferred embodiment, the invention includes two surfaces which move with respect to one another. One of the surfaces has an elongated slot. The other surface has an elongated area of perforation which is positioned transverse to the elongated slot. The surfaces are moved with respect to one another such that the slot and area of perforation are at least partially coincident some of the time, and wherein at some other time the slot and area of perforation are not coincident.

The dimensions of the slot and area of perforation are selected such that when the two are coincident, they define an intersection having a maximum dimension which is smaller than the smallest crosssectional dimension of the particular matter which is expected to be encountered. A vacuum is drawn across the two surfaces such that a fluid, for example, oil, and a particle such as a pebble from a beach are both drawn to the intersection. As the two surfaces move, the pebble tends to roll in the intersection while the oil is drawn therethrough by the vacuum. The removed oil is stored in a container. When the elongated slot and elongated area of perforation are no longer coincident so as to form the intersection, the vacuum against the pebble is lost and the pebble drops back down onto the beach. In this manner, the beach becomes completely cleaned but the structure of the beach is not substantially altered.

The device may also be provided with a steam generator which directs a spray of steam or heated water forwardly of the device to liquify an oil deposit which has evaporated into a heavy sludge so as to improve the efficacy of the device. The steam or warm water spray may be directed to penetrate below the beach surface to loosen oil deposits for removal by the vacuum. The temperature of the water or steam may be regulated accordingly to preserve the organisms which reside on or under the beach.

In addition, the device can be mounted on a vehicle which suspends the device above the beach and which moves the device over the surface of the beach.

BRIEF DESCRIPTION OF THE DRAWINGS

FIG. 4 is a partial, exploded, isometric view of a vacuum plenum and rotating belt employed in one embodiment of the present invention.

FIG. 5 is an enlarged, sectional bottom view illustrating the physical orientation of relatively moving first and second surfaces of the invention.

FIG. 6 is an alternate embodiment illustrating a second possible orientation of first and second surfaces of the invention.

FIG. 7 is another alternate embodiment of the first and second surfaces

BEST MODE FOR CARRYING OUT THE INVENTION

Figure 1:
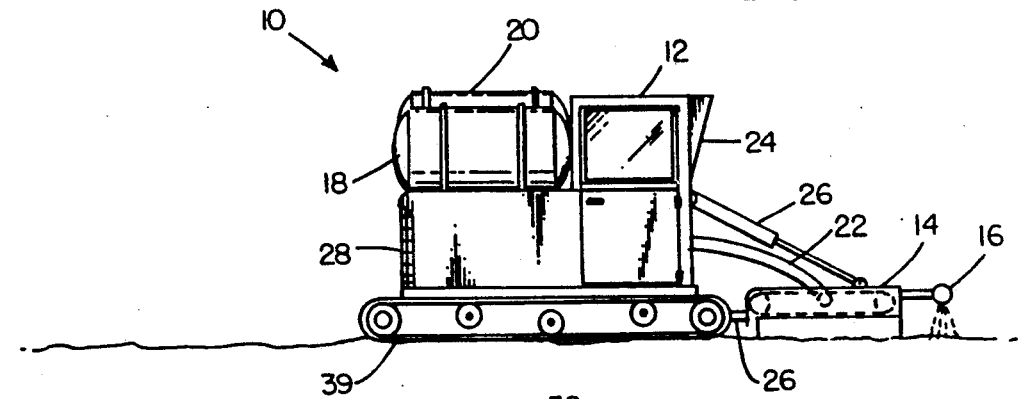
FIG. 1 is a schematic representation of an oil recovery system employing the device of the present invention.

An oil spill clean-up system, in accordance with the principles of the invention, is generally indicated at reference numeral 10 in FIG. 1. The system includes a vehicle 12 which propels and supports a self-cleaning vacuum head 14 and forwardly mounted steam jet manifold 16 above a surface 17 (such as a beach).

The vehicle 12 also has a steam generation system 18 which powers the steam jet manifold 16, and a vacuum generation system 20 which draws oil or other hazardous waste collected by the self-cleaning vacuum head 14 through a conduit 22. The height of the vacuum head 14 and the steam jet manifold 16 above the surface 17 are controlled from a cab section 24 of the vehicle by way of double-acting, hydraulic rams 26. The vehicle also has an engine 28 which drives a conventional hydraulic system (not shown) for operating the hydraulic rams and for operating continuous tracks 30 which propel the vehicle. Other means such as high-floatation wheels may be used to support and propel the vehicle. The self-cleaning vacuum head 14 preferably has a width which is at least as wide as the path traversed by the tracks 30.

The system 10 described above and shown in FIG. 1 is well adapted for rapid deployment to remote areas for recovery of oil or other hazardous materials which have been deposited on beaches. As is described further hereinbelow, the self-cleaning vacuum head 14 thoroughly removes oil or other undesirable materials from a particulate medium such as the beach 17 without substantially disturbing the physical structures of the medium. The steam generation system 18 can be adjusted by the operator of the vehicle 12 to control the pressure and temperature of the steam (or hot water) ejected through the manifold 16. The temperature should be sufficient to liquefy any oil deposits which have become viscous through evaporation while minimizing the destructive impact of the steam (or hot water) on the marine life on and under the surface of the beach 17. The pressure of the steam or water is adjusted so as to penetrate the beach to the deepest level of contamination.

The self-cleaning vacuum head 14 has the unique ability to thoroughly clean individual particles on the surface of the beach 17 without drawing the particles into the vacuum system 22. The self-cleaning vacuum head then redeposits the particles in relatively close proximity to their original location. Thus, the system does not undesirably alter the original structure of the beach in any substantial manner.

Figure 2:
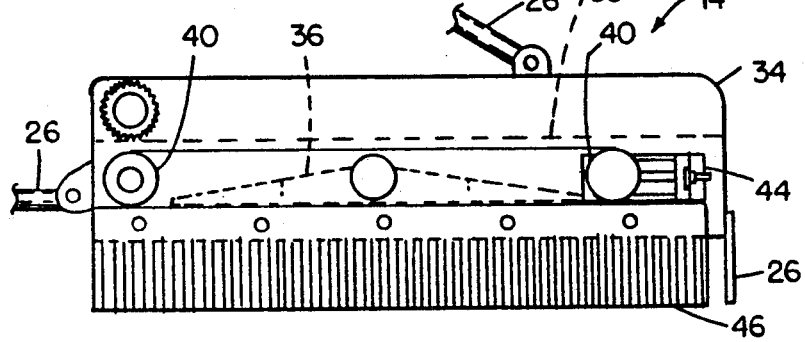
FIG. 2 is a side elevational view of a self-cleaning vacuum head employing the present invention.
Figure 3:
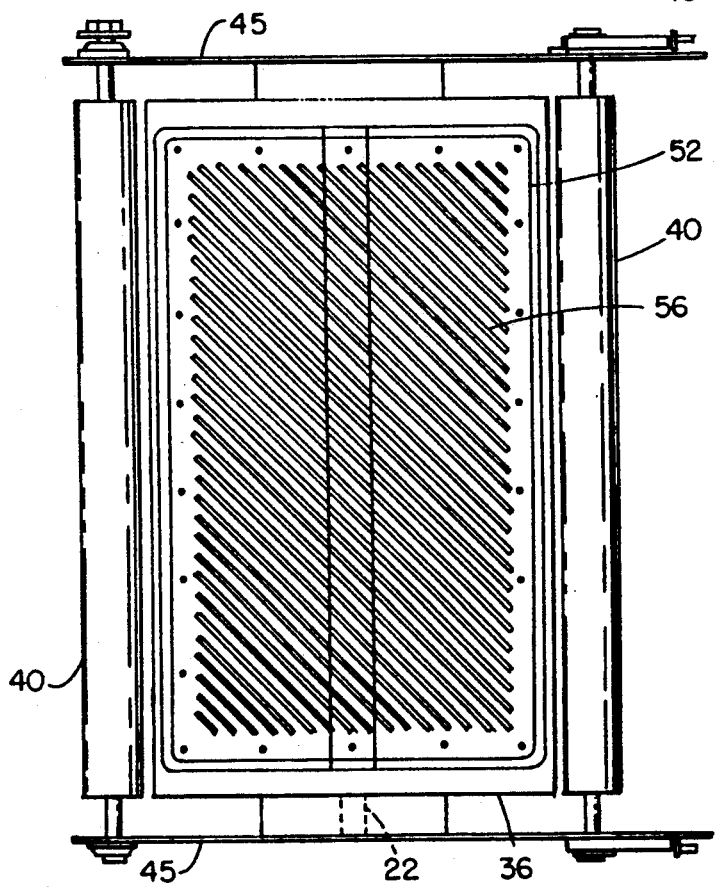
FIG. 3 is a bottom plan view of the vacuum head of FIG. 2 shown with a flexible belt removed.

As best seen in FIGS. 2 through 4, the self-cleaning vacuum head 14 includes a cowling 34 (removed for clarity in FIGS. 3 and 4) which supports therein a vacuum plenum 36. The vacuum plenum is surrounded by a belt 38. The belt is rotatingly supported around the vacuum plenum on a pair of rollers 40, one of which is driven by a hydraulic motor 44. The vacuum plenum, rollers, hydraulic motor and cowling are all attached to frame members 45. The cowling 34 also has attached thereto at the lower periphery thereof a slotted skirt 46 which maintains a pressure differential between vacuum plenum 36 and beach surface for a purpose which will become more fully apparent.

As best seen in FIGS. 4 and 5, the rotating belt 38 has therein a plurality of substantially parallel, elongated slots 50 which when supported by contact with a plate 52 on the vacuum plenum 36, form a first surface 54 for contacting oil or other hazardous material, and/or the particulate matter on the beach 17. The plate 52 also has a plurality of elongated slots 56 (or a series of aligned apertures or perforations which approximate elongated slots) disposed on the plate 52 so as to define a second surface 58 adjacent to the first surface 54.

The elongated slots 56 (or the series of aligned apertures or perforations) are disposed so as to define a series of parallel axes which are transverse to the orientation of the elongated slots 50 in the first surface 54. The vacuum which is generated by the vacuum system 20 is communicated to the vacuum plenum 36 through the conduit 22. Thus, the locus of vacuum at the plane of contact between the beach 17 and the first surface 54 appears at intersections 60 of the elongated slots 50 of the first surface 54 with the elongated slots 56 of the second surface 58. This locus of vacuum is constantly changing as the belt 38 rotates on the rollers 40 around the vacuum plenum 36.

The dimensions of the slots 50 and 56 are selected such that the maximum dimension of the intersections 60 is less than the minimum cross-sectional dimension of particular matter expected to be encountered on the beach. Thus, individual particles are not drawn up into the vacuum plenum 36.

Figure 5A:
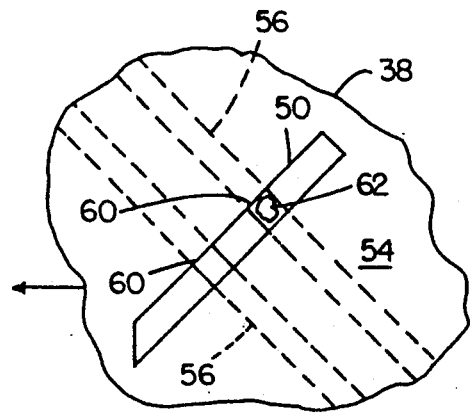
FIGS. 5a-5c are schematic representations of the operation of one embodiment of the invention.
Figure 5B:
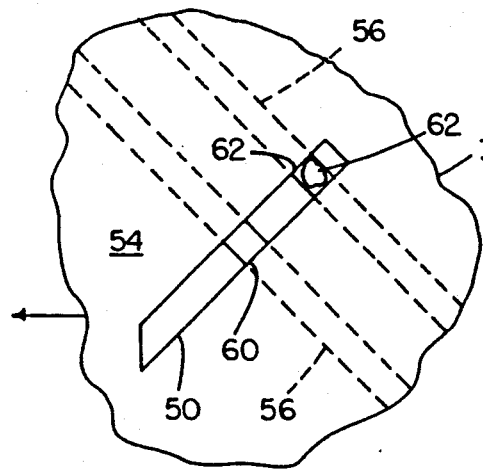
Figure 5C:
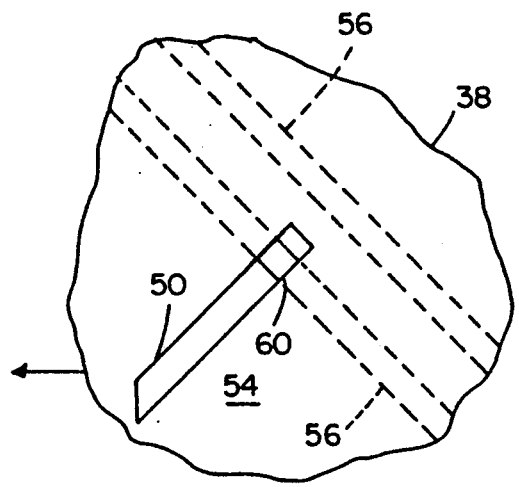

The self-cleaning feature of the vacuum head 14 is achieved by providing the elongated slots 50 with a predetermined length so that particles drawn up against the intersections 60 will be dropped therefrom when the slots 50, 56 move into a non-intersecting position as best illustrated in the sequence of FIGS. 5a through 5c. As shown in schematic representation 5a, a particle 62 is drawn against the intersection of elongated slots 50 and 56 by the vacuum generated by the vacuum system 20. As the belt 38 moves to the left against the fixed plate 52, the particle 62 will move to a position shown in FIG. 5b, and ultimately into a position as shown in FIG. 5c wherein the slots 50 and 56 are no longer coincident due to the termination of the slot 50, the transverse relationship between the slots 50 and 56 and the relative movement of the first and second surfaces 54, 58. Once the intersection of the slots 50 and 56 is lost, the particle 62 will drop back to the surface of the beach at a location relatively close to its original location.

The transverse orientation of the slots also achieves the surprising result of causing the particle 62 to roll within the intersection 60 along two substantially perpendicular axes, thus promoting full and complete separation of contaminants (such as oil) from the surface of the particle. A preferred transverse angle for the slots is approximately 60 degrees, as shown in FIG. 5, although relative angles of up to 90 degrees, as shown in FIG. 6, are effective, particularly if the direction of relative movement of the first and second surfaces is transverse to the orientation of either of the slots. In addition, the slots 50 of the first surface 54 are preferably of varying length so that the vacuum is cut off at different times at various locations.

A preferred arrangement of the first and second surfaces is to have the first surface 54, which will be in contact with the particulate medium as the moving surface. However, as shown in an alternate embodiment of the invention illustrated in FIG. 7, the first surface 64 can be fixed with respect to the cowling 34 of FIG. 2, while the second surface 66 moves with respect to the cowling 34 and thus with respect to the first surface 64. As also shown in FIG. 7, the elongated slots of the first surface may take the form of a single, spiral slot 68 of predetermined length while the second surface 66 has therein a plurality of radial slots 70 on a disk 71 which are rotated about an axis in the direction of arrow 72. A particle trapped at the intersection of the spiral slot 68 and one of the radial slots 70 will move along the path of the spiral slot 68 until the terminus 72 thereof is encountered. At this position, the particle will fall back onto the beach after having been thoroughly cleaned before its redeposition to the beach surface.

Although the invention described above has been shown in the application of recovering oil spills from beaches, the self-cleaning vacuum head 14 has a variety of applications which will be readily apparent to a person of ordinary skill in the art. Some of these applications include sorting two or more materials having substantially different dimensions. An important teaching to be followed in the practice of any such device is to maintain the maximum dimension of the intersection of the slots (or slot and elongated area of perforation) so as to be larger than the maximum anticipated cross-sectional dimension of one of the objects, and smaller than the maximum expected cross-sectional dimension of the remaining object or objects. The smaller of the two objects will be drawn into the vacuum plenum 36 while the larger objects will be left behind. Therefore, the invention is not to be limited to the applications or specific structures disclosed above but is to be determined in scope by the claims which follow.

I claim:

1. A media treatment device constructed and arranged for removing fluid media from particulate matter, comprising:
   a first substantially planar surface for contacting particulate matter, the first surface having an elongated slot aperture for passage of fluid media therethrough in a transverse direction, the slot having a predetermined length defining a slot axis;
   a second substantially planar surface adjacent and substantially parallel to the first surface, the second surface having an elongated area of perforation defining a perforation axis traverse to the slot axis;
   moving means for moving the first and second surfaces with respect to one another in a moving direction which is transverse to both the slot axis and the perforation axis and substantially parallel to the first and second surfaces from a first relative position to a second relative position, wherein at the first position the slot and the area of perforation are at least partially aligned with each other on a locus of vacuum, and wherein at the second position the slot and the area of perforation are not aligned; and
   vacuum means for establishing a pressure differential across the first and second surfaces so that particulate matter is drawn against an intersection between the slot and the area of perforation while the same are aligned to remove the fluid media from the particulate matter and so that the particulate matter is released from the first surface when the slot and area of perforation are not coincident during operation of the device.

2. The device of claim 1 wherein the elongated area of perforation is also a slot defining a second, elongated aperture for passage of the fluid therethrough in a transverse direction.

3. The device of claim 1 wherein the second surface is positioned between the first surface and the vacuum means.

4. The device of claim 3 wherein the second surface is fixed with respect to the vacuum means and wherein the first surface moves with respect to the vacuum means.

5. The device of claim 4 wherein the vacuum means includes a vacuum plenum, wherein the second surface is a plate attached to the vacuum plenum, and wherein the first surface is a flexible, endless belt surrounding the vacuum plenum and rotatively driven thereabout.

6. The device of claim 3 wherein the first surface is fixed with respect to the vacuum means and wherein the second surface moves with respect to the vacuum means.

7. The device of claim 6 wherein the vacuum means includes a vacuum plenum, wherein the first surface is a plate attached to the vacuum plenum, and wherein the second surface is a flexible, endless belt rotatively driven within the vacuum plenum.

8. The device of claim 1 wherein the elongated slot and the elongated area of perforation have a maximum dimension of intersection selected to substantially be smaller than a smallest cross sectional particulate dimension in the fluid media whereby particles drawn against the first surface tend to roll in the intersection so as to promote through separation of the fluid from the particles until the slot and area of perforation are no longer coincident.

9. A vacuum pick up device constructed and arranged for removing fluid media from selected particulate matter comprising:
a first substantially planar surface for contacting particulate matter, the first surface having an elongated slot aperture for passage of fluid media therethrough in a transverse direction, the slot having a predetermined length and width defining a slot axis;
a second substantially planar surface adjacent to the first surface, the second surface having an elongated area of perforation having a predetermined width and defining a perforation axis transverse to the slot axis;
moving means for moving the first and second surfaces with respect to one another in a moving direction which is transverse to both the slot axis and the perforation axis and substantially parallel to the first and second surfaces from a first relative position to a second relative position, wherein at the first position the slot and the area of perforation are at least partially aligned so as to form an intersection having a maximum dimension selected to substantially be smaller than a smallest cross sectional dimension of the selected particulate matter, and wherein at the second position the slot and the area of perforation are not aligned; and
vacuum means for establishing a pressure differential across the first and second surfaces so that particulate matter is drawn against the first surface and tends to roll in the intersection as the surfaces move with respect to one another so as to promote thorough separation of the fluid media from the particulate matter until the slot and area of perforation are no longer coincident so as to release the particulate matter from the first surface during operation of the device.

10. The device of claim 9 wherein the elongated area of perforation is also a slot.

11. The device of claim 9 wherein the second surface is positioned between the first surface and the vacuum means.

12. The device of claim 11 wherein the second surface is fixed with respect to the vacuum means and wherein the first surface moves with respect to the vacuum means.

13. The device of claim 12 wherein the vacuum means includes a vacuum plenum, wherein the second surface is a plate attached to the vacuum plenum, and wherein the first surface is a flexible, endless belt surrounding the vacuum plenum and rotatively driven thereabout.

14. The device of claim 11 wherein the first surface is fixed with respect to the vacuum means and wherein the second surface moves with respect to the vacuum means.

15. The device of claim 14 wherein the vacuum means includes a vacuum plenum, wherein the first surface is a plate attached to the vacuum plenum, and wherein the second surface is a flexible, endless belt rotatively driven with the vacuum plenum.

16. The device of claim 9, including a vehicle for carrying the device in a suspended manner over the fluid media to be treated and steam jets mounted forwardly of the device to decrease the viscosity of the fluid media to be removed from the particulate matter.

* * * * *